United States Patent
Ma et al.

(10) Patent No.: US 9,774,715 B2
(45) Date of Patent: Sep. 26, 2017

(54) MOBILE TERMINAL

(71) Applicants: BOE TECHNOLOGY GROUP CO., LTD., Beijing (CN); BEIJING BOE DISPLAY TECHNOLOGY CO., LTD., Beijing (CN)

(72) Inventors: Weichao Ma, Beijing (CN); Zhihua Sun, Beijing (CN); Baoyu Liu, Beijing (CN); Guohuo Su, Beijing (CN); Zhihao Zhang, Beijing (CN); Xu Zhang, Beijing (CN)

(73) Assignees: BOE TECHNOLOGY GROUP CO., LTD., Beijing (CN); BEIJING BOE DISPLAY TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 15/205,209

(22) Filed: Jul. 8, 2016

(65) Prior Publication Data
US 2017/0208161 A1    Jul. 20, 2017

(30) Foreign Application Priority Data
Jan. 19, 2016   (CN) .......................... 2016 1 0035214

(51) Int. Cl.
*H04M 1/00* (2006.01)
*H04M 1/03* (2006.01)
(Continued)

(52) U.S. Cl.
CPC .............. *H04M 1/03* (2013.01); *H02J 7/025* (2013.01); *H02J 50/10* (2016.02); *H04B 1/3833* (2013.01)

(58) Field of Classification Search
CPC .... H02J 7/025; H02J 7/32; H02J 13/00; H02J 5/005; H02J 7/0027; H02J 7/0044;
(Continued)

(56) References Cited

U.S. PATENT DOCUMENTS 6,930,848 B1 * 8/2005 Codilian ................ G11B 19/00
 310/15
2007/0278997 A1   12/2007 Chang et al.
(Continued)

FOREIGN PATENT DOCUMENTS

CN          102610868 A      7/2012
CN          202495868 U     10/2012
(Continued)

OTHER PUBLICATIONS

Office Action from corresponding Chinese Application No. 201610035214.1, dated Jul. 5, 2017 (6 pages).

*Primary Examiner* — Golan Sorowar
(74) *Attorney, Agent, or Firm* — Harness, Dickey & Pierce, P.L.C.

(57) ABSTRACT

The embodiments of the disclosure provide a mobile terminal, which includes a power generation unit, a power storage unit and a control system. The power generation unit includes a toroidal inductance coil which can move back and forth inside and outside a region of magnetic field generated by a permanent magnet and incise magnetic force lines of the permanent magnet, such that a current is generated in the toroidal inductance coil. The power storage unit is connected with the toroidal inductance coil of the power generation unit and a power supply circuit of the mobile terminal, respectively, and the power storage unit is used for storing power generated by the power generation unit. The control system is connected with the power storage unit. When electricity of a battery of the mobile terminal is less than a predetermined amount and the battery is not in a charged state, the control system causes the power storage unit to supply power to the mobile terminal.

12 Claims, 2 Drawing Sheets

(51) Int. Cl.
*H02J 7/02* (2016.01)
*H02J 50/10* (2016.01)
*H04B 1/3827* (2015.01)

(58) Field of Classification Search
CPC .......... H04B 1/3883; H04B 3/52; H04B 3/54; H04B 3/56; H04B 5/0012; H04B 5/0018; H04B 5/0075
See application file for complete search history.

(56) References Cited

U.S. PATENT DOCUMENTS

| | | | |
|---|---|---|---|
| 2012/0242086 A1 | 9/2012 | Yang | |
| 2013/0154554 A1* | 6/2013 | Sakai | H02J 7/025 320/108 |
| 2013/0207600 A1 | 8/2013 | He | |
| 2015/0349575 A1* | 12/2015 | Yang | H02J 7/025 455/573 |
| 2016/0315662 A1* | 10/2016 | Henry | H04B 5/0018 |

FOREIGN PATENT DOCUMENTS

| | | | |
|---|---|---|---|
| CN | 102780260 A | | 11/2012 |
| CN | 103701187 | * | 4/2014 |
| CN | 205304357 U | | 6/2016 |

* cited by examiner

MOBILE TERMINAL

This application claims the benefit and priority of Chinese Patent Application No. 201610035214.1 filed Jan. 19, 2016. The entire disclosure of the above application is incorporated herein by reference.

FIELD

The present disclosure relates to a mobile terminal.

BACKGROUND

This section provides background information related to the present disclosure which is not necessarily prior art.

The role and advantages of a mobile terminal (e.g., cellphone or tablet computer and etc.) as an electronic product become increasingly noticeable in peoples' life. However, due to a limited storage of electricity in the battery of a mobile terminal, the mobile terminal needs to be charged after being used for a certain period of time, for example, the battery of an existing cellphone needs be charged every day. When a user goes outdoors, if electricity of the battery of his mobile terminal is less than a minimum amount (i.e., a predetermined amount of electricity) required by the mobile terminal in use, and charging is hardly possible or the battery of the mobile terminal is not charged (i.e., when electricity of the mobile terminal is insufficient to continue using the mobile terminal, and the battery of the mobile terminal is not charged), the mobile terminal cannot be used, which thus causes inconveniences to the user.

SUMMARY

This section provides a general summary of the disclosure, and is not a comprehensive disclosure of its full scope or all of its features.

The embodiments of the disclosure provide a mobile terminal comprising a loudspeaker internally provided with a permanent magnet, the mobile terminal further comprising:

a power generation unit including a toroidal inductance coil which can move back and forth inside and outside a region of magnetic field generated by the permanent magnet, and incise magnetic force lines of the permanent magnet, a current being generated in the toroidal inductance coil when the toroidal inductance coil moves back and forth;

a power storage unit connected with the toroidal inductance coil of the power generation unit and a power supply circuit of the mobile terminal, respectively, the power storage unit being used for storing power generated by the power generation unit;

a control system connected with the power storage unit, the control system causing the power storage unit to supply power to the mobile terminal when determining that electricity of a battery of the mobile terminal is less than a predetermined amount and the battery is not in a charged state.

In the embodiments of the disclosure, the toroidal inductance coil may include a toroidal core and a wire wound on the toroidal core, the outer surface of the wire being coated with insulation varnish.

In the embodiments of the disclosure, a cross section of the toroidal core may be perpendicular to the magnetic force lines of the permanent magnet.

In the embodiments of the disclosure, a cross section of the toroidal core may be a rectangular cross section, a length of which may be 20 mm~40 mm and a width of which may be 15 mm~30 mm.

In the embodiments of the disclosure, a length of the rectangular cross section may be 25 mm and a width of the rectangular cross section may be 20 mm.

In the embodiments of the disclosure, the turns of the toroidal inductance coil may be 1000 turns~10000 turns.

In the embodiments of the disclosure, the turns of the toroidal inductance coil may be 5000 turns.

In the embodiments of the disclosure, the power generation unit further includes an outer frame fixed on a rear cover or a frame of the mobile terminal; the toroidal inductance coil is located inside the outer frame, and both sides of the toroidal inductance coil may be connected with opposite sides of the outer frame via elastic members in the direction in which the toroidal inductance coil moves back and forth.

In the embodiments of the disclosure, either of the both sides of the toroidal inductance coil may be connected with a corresponding side of the outer frame via two elastic members in the direction in which the toroidal inductance coil moves back and forth.

In the embodiments of the disclosure, the power storage unit may include a bridge rectifier circuit and a power storage circuit, the bridge rectifier circuit being connected with the toroidal inductance coil and the power storage circuit, respectively, the power storage circuit being connected with the power supply circuit of the mobile terminal.

In the embodiments of the disclosure, magnetic induction intensity of the permanent magnet may be 0.05 T~0.1 T.

In the embodiments of the disclosure, magnetic induction intensity of the permanent magnet may be 0.05 T.

In the embodiments of the disclosure, the control system also may be connected with the power generation unit and the loudspeaker, respectively; and the control system causes the power generation unit to stop inputting a current to the power storage unit when determining that the loudspeaker is in a working state.

In the mobile terminal provided by the embodiments of the disclosure, when moving back and forth inside and outside a region of magnetic field generated by the permanent magnet, the toroidal inductance coil of the power generation unit incises magnetic force lines of the permanent magnet, so when the toroidal inductance coil moves back and forth, an area passed through by the magnetic force lines, within the cross section of the toroidal inductance coil is constantly changing, as a result, magnetic flux in the toroidal inductance coil changes and a current is generated in the toroidal inductance coil, i.e., the power generation unit generates power, so it is achieved that the power generation unit generates power with the permanent magnet inside the loudspeaker of the mobile terminal. The power generated by the power generation unit is transmitted into and stored by the power storage unit. When determining that electricity of the battery of the mobile terminal is less than a predetermined amount and the battery is not in a charged state, the control system causes the power storage unit to supply power to the mobile terminal. Therefore, when electricity of the battery of the mobile terminal is less than a predetermined amount and the battery is not in a charged state, the mobile terminal provided by the embodiments of the disclosure can be used as usual.

Further aspects and areas of applicability will become apparent from the description provided herein. It should be understood that various aspects of this disclosure may be implemented individually or in combination with one or more other aspects. It should also be understood that the description and specific examples herein are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts or features throughout the several views of the drawings.

DETAILED DESCRIPTION

Example embodiments will now be described more fully with reference to the accompanying drawings.

Figure 1:
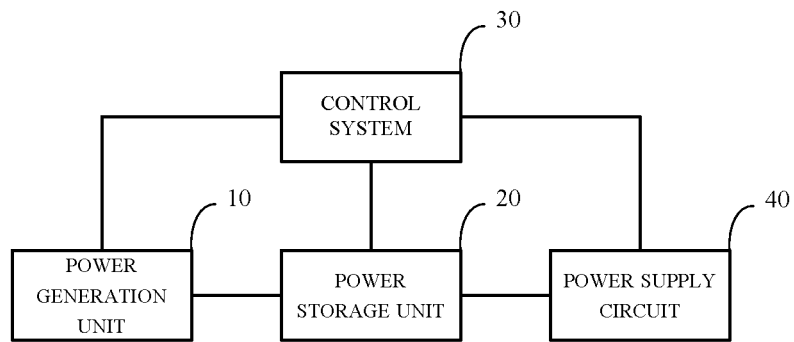
FIG. 1 is a structural block diagram of the mobile terminal according to the embodiments of the disclosure.
Figure 2:
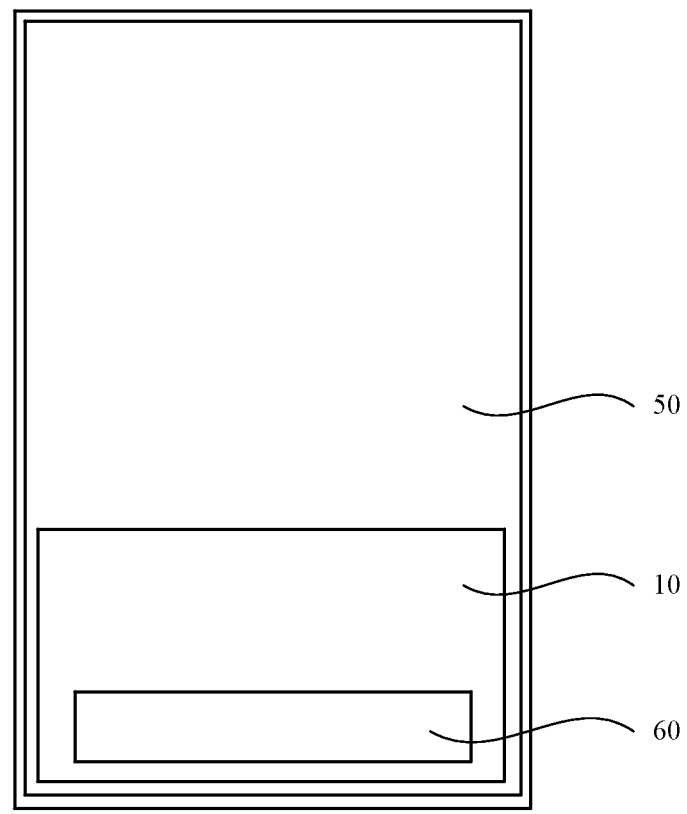
FIG. 2 is a structural schematic diagram of the mobile terminal according to the embodiments of the disclosure.
Figure 3:
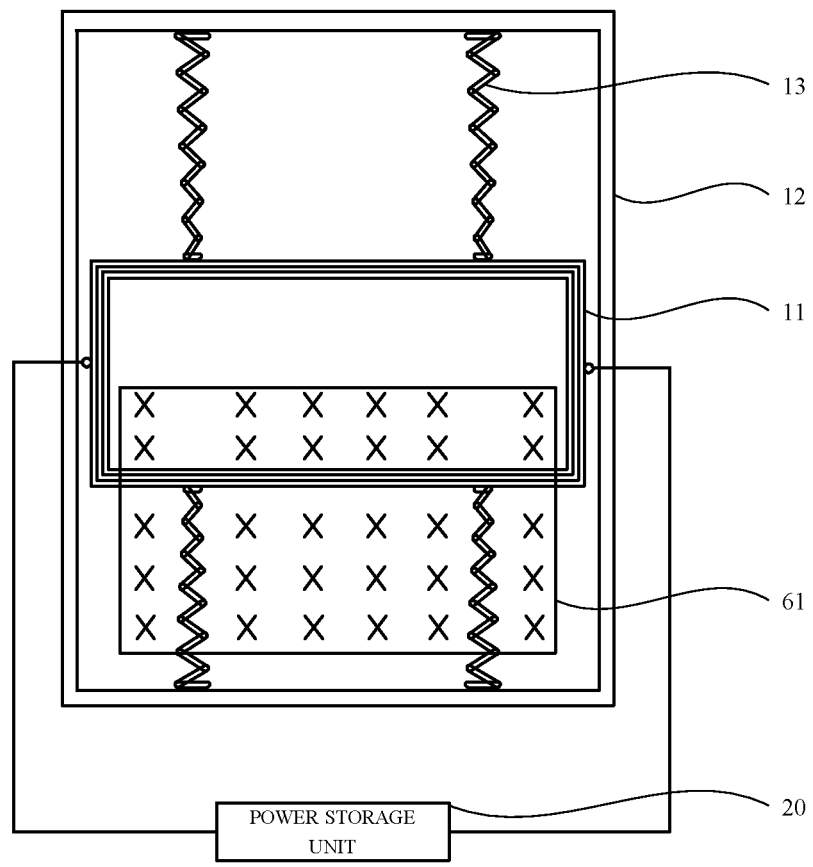
FIG. 3 is a structural schematic diagram of the power generation unit in FIG. 1.

Refer to FIGS. 1, 2 and 3, a mobile terminal 50 according to embodiments of the disclosure has a loudspeaker internally provided with a permanent magnet 60. The mobile terminal 50 also at least includes a power generation unit 10, a power storage unit 20 and a control system 30. The power generation unit 10 includes toroidal inductance coil 11 which can move back and forth inside and outside a region 61 of magnetic field generated by the permanent magnet 60, and incise magnetic force lines of the permanent magnet 60. A current is generated in the toroidal inductance coil 11 when the toroidal inductance coil 11 moves back and forth. A power storage unit 20 is connected with the toroidal inductance coil 11 of the power generation unit 10 and a power supply circuit 40 of the mobile terminal 50, respectively. The power storage unit 20 is used for storing power generated by the power generation unit 10. A control system 30 is connected with the power storage unit 20. The control system 30 causes the power storage unit 20 to supply power to the mobile terminal 50 when determining that electricity of a battery of the mobile terminal is less than a predetermined amount and the battery is not in a charged state.

Specifically, as shown by FIGS. 2 and 3, the mobile terminal 50 (e.g., cellphone or tablet computer and etc.) has a loudspeaker internally provided with a permanent magnet 60. The permanent magnet 60 generates a magnetic field which forms a region 61 of magnetic field. The toroidal inductance coil 11 of the power generation unit 10 is opposite to the region 61 of magnetic field of the permanent magnet 60, and the cross section of the toroidal inductance coil 11 is not in parallel with the magnetic force lines of the permanent magnet 60, that is, the magnetic force lines of the permanent magnet 60 may penetrate the annular space formed by the toroidal inductance coil 11. The toroidal inductance coil 11 can move back and forth inside and outside the region 61 of magnetic field generated by the permanent magnet 60, for example, the toroidal inductance coil 11 may, like a clock pendulum, be hung above the region 61 of magnetic field. When the way of placing the mobile terminal 50 changes (e.g., the mobile terminal 50 is turned over) or the mobile terminal 50 vibrates, the toroidal inductance coil 11 can swing back and forth inside and outside the region 61 of magnetic field. Or, an eccentric gyro is disposed on the toroidal inductance coil 11. When a center of gravity of the mobile terminal shifts or the mobile terminal vibrates, the eccentric gyro actuates the toroidal inductance coil 11 to swing back and forth inside and outside the region 61 of magnetic field. When the toroidal inductance coil 11 moves back and forth, the toroidal inductance coil 11 incises the magnetic force lines of the permanent magnet 60, and a current is generated in the toroidal inductance coil 11. A current generated in the toroidal inductance coil 11 is transmitted into and stored by the power storage unit 20 so as to supply power to the mobile terminal 50 when electricity of the battery of the mobile terminal 50 is less than a predetermined amount and the battery is not in a charged state.

When the mobile terminal 50 (e.g., cellphone) vibrates or the way of placing the mobile terminal 50 changes, for example, when a user carrying the mobile terminal is doing sports (e.g., walking, going upstairs, going downstairs or jogging), or the mobile terminal 50 vibrates when being used (e.g., vibrating when the screen is touched or vibrating when the user is playing a mobile game), or, when the user turns over the mobile terminal, the toroidal inductance coil 11 of the power generation unit 10 moves back and forth inside and outside the region 61 of magnetic field and incise magnetic force lines of the permanent magnet 60, so that an area passed through by the magnetic force lines, within the cross section of the toroidal inductance coil 11 is constantly changing when the toroidal inductance coil 11 moves back and forth. For example, when the toroidal inductance coil 11 incises the magnetic force lines along the upward direction in FIG. 3, the area, passed through by the magnetic force lines, within the cross section of the toroidal inductance coil 11 gradually decreases; when the toroidal inductance coil 11 incises the magnetic force lines along the downward direction in FIG. 3, the area, passed through by the magnetic force lines, within the cross section of the toroidal inductance coil 11 gradually increases. As the area, passed through by the magnetic force lines, within the cross section of the toroidal inductance coil 11 is constantly changing when the toroidal inductance coil 11 moves back and forth, magnetic flux in the toroidal inductance coil 11 changes and a current is generated in the toroidal inductance coil 11, i.e., the power generation unit 10 starts to generate power, so it is achieved that the power generation unit 10 generates power with the permanent magnet 60 inside the loudspeaker of the mobile terminal 50. The power generated by the power generation unit 10 is transmitted into and stored by the power storage unit 20.

The control system 30 obtains an amount of electricity and a state of the battery of the mobile terminal 50, and determines whether the following conditions are satisfied: an amount of electricity of the battery of the mobile terminal 50 is less than a predetermined amount, and the battery of the mobile terminal 50 is not in a charged state. When these conditions are satisfied, that is, an amount of electricity of the battery of the mobile terminal 50 is insufficient to maintain normal use of the mobile terminal 50 (e.g., electricity of the battery of the mobile terminal 50 is less than a minimum amount required by the mobile terminal in normal use, or electricity of the battery of the mobile terminal 50 is used up) and the battery of the mobile terminal 50 is not charged, that is, when it is necessary that the power storage unit 20 supplies power to the mobile terminal 50, the control system 30 sends, to the power storage unit 20, an instruction requiring the power storage unit 20 to supply power to the mobile terminal 50, such that the power storage unit 20 supplies power to the mobile terminal 50, to avoid that the mobile terminal 50 cannot be used because electricity of the battery of the mobile terminal 50 is less than a predetermined amount and the battery is not in a charged state. That is, the mobile terminal 50 according to embodiments of the disclosure can continue to be used as usual when electricity of the battery of the mobile terminal 50 is less than a predetermined amount and the battery is not in a charged state.

It is worth pointing out that the control system 30 may be provided separately, or may be integrated in an intelligent system of the mobile terminal 50.

In the embodiments of the disclosure, the toroidal inductance coil 11 includes a toroidal core and a wire wound on the toroidal core, the outer surface of the wire being coated with insulation varnish. Specifically, the toroidal inductance coil 11 includes a toroidal core which further includes a toroidal body. The wire whose outer surface is coated with insulation varnish may be helically wound on the body, or, the wire is wound around the outer contour of the body. The turns n of the toroidal inductance coil 11 may be set in accordance with actual needs, for example, in a range of 1000 turns~10000 turns, such as, 1000 turns, 5000 turns, or 10000 turns. Coating insulation varnish on the outer surface of the wire may insulate each turn of coil from other turns of coil, thus preventing current in two adjacent turns of coils from interfering with each other and improving electrodynamic potential generated when the toroidal inductance coil 11 is moving back and forth.

In the aforesaid embodiment, the toroidal inductance coil 11 includes a toroidal core. However, in actual applications, the toroidal inductance coil 11 may not include a toroidal core, at this time, the toroidal inductance coil 11 may be wound with a wire to form annular inductance coil.

In the aforesaid embodiment, the magnetic force lines of the permanent magnet 60 may penetrate the annular space formed by the toroidal inductance coil 11, that is, the cross section of the toroidal core of the toroidal inductance coil 11 is not in parallel with the magnetic force lines of the permanent magnet 60, i.e., the cross section of the toroidal core forms an angle with the magnetic force lines of the permanent magnet 60, for example, the angle being 30°, or 60°. In the embodiments of the disclosure, the cross section of the toroidal core is perpendicular to the magnetic force lines of the permanent magnet 60, i.e., the cross section of the toroidal core forms an angle of 90° with the magnetic force lines of the permanent magnet 60 to increase an variation of the area, passed through by the magnetic force lines, within the cross section of the toroidal inductance coil 11 when the toroidal inductance coil 11 moves back and forth, and to further increase electrodynamic potential generated when the toroidal inductance coil 11 is moving back and forth.

The cross section of the toroidal core of the toroidal inductance coil 11 may be circular, triangular, rectangular or polygonal, i.e., the cross section of the toroidal inductance coil 11 may be circular, triangular, rectangular or polygonal. In the embodiments of the disclosure, the cross section of the toroidal core is rectangular cross section, a length of which is 20 mm~40 mm and a width of which is 15 mm~30 mm, for example, a length of the rectangular cross section is 25 mm and a width of the rectangular cross section is 20 mm, i.e., an area S surrounded by the wire of the toroidal inductance coil 11 is 500 mm$^2$.

In the embodiments of the disclosure, the power generation unit 10 further includes an outer frame 12 fixed on a rear cover or a frame of the mobile terminal 50. The toroidal inductance coil 11 is located inside the outer frame 12, and both sides of the toroidal inductance coil 11 are connected with opposite sides of the outer frame 12 via elastic members 13 in the direction in which the toroidal inductance coil 11 moves back and forth. Specifically, as shown by FIG. 3, the cross section of the toroidal inductance coil 11 is rectangular, and the cross section of the outer frame 12 is also rectangular. The outer frame 12 is fixed on the rear cover or the frame of the mobile terminal 50. The toroidal inductance coil 11 is located inside the outer frame and can move back and forth inside and outside a region 61 of magnetic field along the upward and downward directions in FIG. 3 and incises the magnetic force lines. The upper side of the toroidal inductance coil 11 is connected with the upper side of the outer frame 12 via elastic members 13; the lower side of the toroidal inductance coil 11 is connected with the lower side of the outer frame 12 via elastic members 13. When the mobile terminal 50 vibrates or the way of placing the mobile terminal 50 changes, the elastic members 13 actuate the toroidal inductance coil 11 to move back and forth along the upward and downward directions in FIG. 3 to incise the magnetic force lines of the permanent magnet 60. When the elastic members 13 actuate the toroidal inductance coil 11 to move back and forth, an area passed through by the magnetic force lines, within the cross section of the toroidal inductance coil 11 is constantly changing, as a result, magnetic flux in the cross section of the toroidal inductance coil 11 is constantly changing, such that a current is generated in the toroidal inductance coil 11, i.e., the power generation unit 10 starts to generate power. The elastic members 13 may be springs or shrapnels.

The arrangement of the outer frame 12 may restrict the moving direction of the toroidal inductance coil 11 and improve reliability and effectiveness of power generation by the power generation unit 10 making use of the magnetic field generated by the permanent magnet 60. Furthermore, the toroidal inductance coil 11, the elastic members 13 and the outer frame 12 are assembled into an entirety to form a power generation unit 10. In this way, when the mobile terminal 50 is assembled, the power generation unit 10 can be mounted onto the mobile terminal 50 merely by fixing the outer frame 12 onto the rear cover or the frame of the mobile terminal 50, so as to make it easy to mount the power generation unit 10 and assemble the mobile terminal 50.

In the aforesaid embodiment, either of the both sides of the toroidal inductance coil 11 is connected with a corresponding side of the outer frame 12 via an elastic element 13, or via two or more than two elastic members 13 in the direction in which the toroidal inductance coil 11 moves back and forth. For example, the cross section of the toroidal inductance coil 11 is rectangular, and the cross section of the outer frame 12 is also rectangular. The upper side of the toroidal inductance coil 11 is connected with the upper side of the outer frame 12 via an elastic element 13 or via two or more than two elastic members 13; the lower side of the toroidal inductance coil 11 is connected with the lower side of the outer frame 12 via an elastic element 13 or via two or more than two elastic members 13.

In the embodiments of the disclosure, as shown by FIG. 3, either of the both sides of the toroidal inductance coil 11 is connected with a corresponding side of the outer frame 12 via two elastic members 13 in the direction in which the toroidal inductance coil 11 moves back and forth. For example, as shown by FIG. 3, the cross section of the toroidal inductance coil 11 is rectangular, and the cross section of the outer frame 12 is also rectangular. The upper side of the toroidal inductance coil 11 is connected with the upper side of the outer frame 12 via two elastic members 13; the lower side of the toroidal inductance coil 11 is connected with the lower side of the outer frame 12 via two elastic members 13. Such a design may improve stability of the toroidal inductance coil 11 moving back and forth, and further improve reliability and effectiveness of power generation by the power generation unit 10 making use of the magnetic field generated by the permanent magnet 60, and meanwhile, avoid a small moving distance of the toroidal inductance coil 11 caused by a large number of elastic members 13, so as to increase an variation of the area, passed through by the magnetic force lines, within the cross section of the toroidal inductance coil 11 when the toroidal inductance coil 11 moves back and forth, and to further increase electrodynamic potential generated when the toroidal inductance coil 11 is moving back and forth.

When the mobile terminal provided with the aforesaid power generation unit 10 vibrates, the toroidal inductance coil 11 of the power generation unit 10 starts to incise the magnetic force lines back and forth. When the toroidal inductance coil 11 moves back and forth, an area passed through by the magnetic force lines, within the cross section of the toroidal inductance coil 11 is constantly changing. When the toroidal inductance coil 11 moves back and forth, if the moving direction of the toroidal inductance coil 11 changes, the area, passed through by the magnetic force lines, within the cross section of the toroidal inductance coil 11 changes from a gradual increase to a gradual decrease, or from a gradual decrease to a gradual increase. For example, when the toroidal inductance coil 11 moves upward in FIG. 3, the area, passed through by the magnetic force lines, within the cross section of the toroidal inductance coil 11 decreases; when the toroidal inductance coil 11 moves downward in FIG. 3, the area, passed through by the magnetic force lines, within the cross section of the toroidal inductance coil 11 increases, consequently, the flowing direction of a current in the toroidal inductance coil 11 varies with change of the moving direction of the toroidal inductance coil 11, that is, the power generated by the power generation unit 10 is alternating current.

Figure 4:
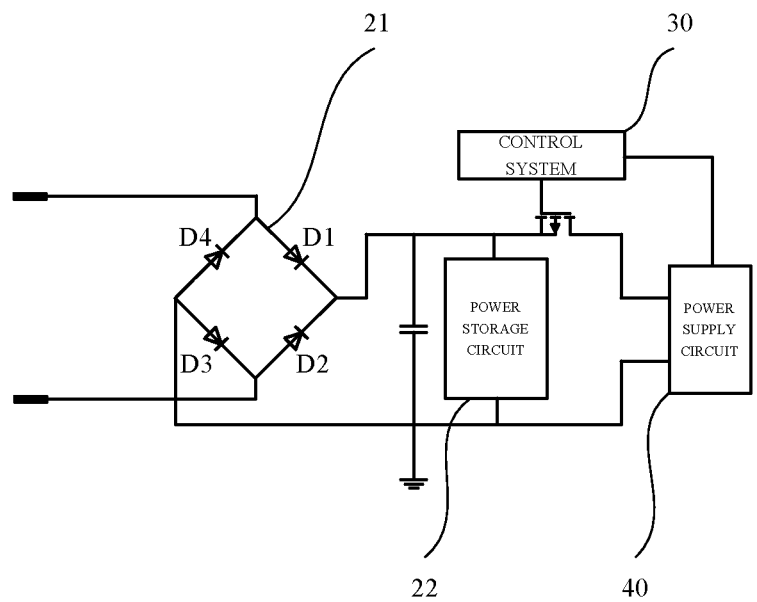
FIG. 4 is a structural schematic diagram of the power storage unit in FIG. 1.

Therefore, in order to meet requirements for use of electric power by the mobile terminal 50 and facilitate electric power storage, as shown by FIG. 4, the power storage unit 20 includes a bridge rectifier circuit 21 and a power storage circuit 22. The bridge rectifier circuit 21 is connected with the toroidal inductance coil 11 and the power storage circuit 22, respectively. The power storage circuit 22 is connected with the power supply circuit 40 of the mobile terminal. The bridge rectifier circuit 21 includes four diodes D1, D2, D3 and D4. The positive electrode of D1 is connected with the negative electrode of D4; the negative electrode of D1 is connected with the negative electrode of D2; the positive electrode of D2 is connected with the negative electrode of D3; the positive electrode of D3 is connected with the positive electrode of D4. The positive electrode of D1 and the negative electrode of D4 are connected with one terminal of the toroidal inductance coil 11, respectively; the negative electrode of D3 and the positive electrode of D2 are connected with the other terminal of the toroidal inductance coil 11, respectively; the negative electrode of D1 and the negative electrode of D2 are connected with one terminal of the power storage circuit 22, respectively; the positive negative electrode of D3 and the positive electrode of D4 are connected with the other terminal of the power storage circuit 22, respectively. The bridge rectifier circuit 21 is used for converting the alternating current generated by the power generation unit 10 into direct current which is then transmitted to the power storage circuit 22 and is stored therein.

The working process of the bridge rectifier circuit 21 can be described as follows: when the alternating current output by the power generation unit 10 is at a positive half cycle, a forward voltage is applied to D1 and D3, i.e., D1 and D3 is turned on, while a backward voltage is applied to D2 and D4, i.e., D2 and D4 is turned off, so as to form a current loop passing through the toroidal inductance coil 11, D1, the power storage circuit 22 and D3 and to form a positive half-wave rectifier voltage on the power storage circuit 22; when the alternating current output by the power generation unit 10 is at a negative half cycle, a forward voltage is applied to D2 and D4, i.e., D2 and D4 is turned on, while a backward voltage is applied to D1 and D3, i.e., D1 and D3 is turned off, so as to form a current loop passing through the toroidal inductance coil 11, D2, the power storage circuit 22 and D4 and likewise, to form a positive half-wave rectifier voltage on the power storage circuit 22. This process is repeated in such a way to obtain a unidirectional pulse voltage in the same direction on the power storage circuit 22, which enables to convert the alternating current generated by the power generation unit 10 into direct current.

Using the bridge rectifier circuit 21 to convert the alternating current generated by the power generation unit 10 into direct current may meet requirements for use of electricity by the mobile terminal 50. Apart from this, converting the alternating current generated by the power generation unit 10 into direct current makes power storage easier.

In the aforesaid embodiment, magnetic induction intensity of the permanent magnet 60 may be 0.05 T~0.1 T, for example, 0.05 T.

In the embodiments of the disclosure, the control system 30 may further be connected with the power generation unit 10 and the loudspeaker, respectively; and the control system 30 causes the power generation unit 10 to stop inputting a current to the power storage unit 20 when determining that the loudspeaker is in a working state. Specifically, the control system 30 obtains the state of the loudspeaker and determines whether the loudspeaker is in a working state, if so (e.g., playing music), the control system 30 causes the power generation unit 10 to stop inputting a current to the power storage unit 20, for example, disconnecting the current path between the toroidal inductance coil 11 and the bridge rectifier circuit 21, to prevent interferences with the work of the loudspeaker when the power generation unit 10 inputs a current to the power storage unit 20.

For further illustration to the disclosure to demonstrate that the embodiments of the disclosure can indeed avoid that the mobile terminal cannot be used when electricity of the battery of the mobile terminal is less than a predetermined amount and the battery is not in a charged state, a description to the technical solutions of the embodiments of the disclosure with a specific example is made as follows:

Take a cellphone for instance, the permanent magnet 50 of the loudspeaker is beneath the back of the cellphone. The cross section of the outer frame 12 of the power generation unit 10 is rectangular, and the outer frame 12 is fixed on the rear cover or the frame of the cellphone. The toroidal inductance coil 11 includes a toroidal core whose cross section is rectangular, i.e., the cross section of the toroidal inductance coil 11 is rectangular. The toroidal inductance coil 11 is opposite to the permanent magnet 60, and the cross section of the toroidal inductance coil 11 is perpendicular to the magnetic force lines of the permanent magnet 60. The toroidal inductance coil 11 is located inside the outer frame 12. As shown by FIG. 3, the upper side of the toroidal inductance coil 11 is connected with the upper side of the outer frame 12 via two elastic members 13; the lower side of the toroidal inductance coil 11 is connected with the lower side of the outer frame 12 via two elastic members 13. Two terminals of the toroidal inductance coil 11 are connected with the bridge rectifier circuit 21 of the power storage unit 20, respectively.

A length of the cross section of the toroidal core is 25 mm and a width of the cross section of the toroidal core is 20 mm, that is, the area S surrounded by the wire of the toroidal inductance coil 11 is 500 mm$^2$. The turns n of the toroidal inductance coil 11 is 5000 turns, and a vibration period T of the toroidal inductance coil 11 is 0.1 s. Magnetic induction intensity B generated by the permanent magnet 60 is 0.05 T. Suppose that the area, passed through by the magnetic force lines, within the cross section of the toroidal inductance coil 11 becomes 0 from the area S surrounded by the wire of the toroidal inductance coil 11, that is, when the toroidal inductance coil 11 moves back and forth, an variation ΔS of the area, passed through by the magnetic force lines, within the cross section of the toroidal inductance coil 11 is 500 mm$^2$, and the electrodynamic potential E generated when the toroidal inductance coil 11 is moving back and forth is 1.25V (E=n(ΔφT)=n(B*ΔS/T)). Suppose that a resistance R of the circuit loop is 50Ω and a valid vibration time of the toroidal inductance coil 11 every day is 5 h, the power generation unit 10 may generate electricity of 125 mAh every day, i.e., electricity of 125 mAh may be stored in the power storage circuit 22 of the power storage unit 20 every day. Take the existing iPhone 5S for example, a total amount of electricity of the battery of iPhone 5S is 1440 mAh, that is, the amount of electricity generated by the power generation unit 10 every day takes up 9% of the total amount of electricity of the battery of iPhone 5S. When electricity of the battery of iPhone 5S is less than a predetermined amount or is used up and the battery is not in a charged state, the electricity stored in the power storage circuit 22 of the power storage unit 20 may supply power to iPhone 5S in order that iPhone 5S can work normally.

In the description above, those skilled in the art may combine specific features, structures, materials or characteristics in an appropriate manner in one or more embodiments or examples.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The invention claimed is:

1. A mobile terminal comprising:
a loudspeaker internally provided with a permanent magnet;
a power generation unit including a toroidal inductance coil which can move back and forth inside and outside a region of a magnetic field generated by the permanent magnet, and incise magnetic force lines of the permanent magnet, a current generated in the toroidal inductance coil when the toroidal inductance coil moves back and forth;
a power storage unit connected with the toroidal inductance coil of the power generation unit and a power supply circuit of the mobile terminal, respectively, the power storage unit used for storing power generated by the power generation unit; and
a control system connected with the power storage unit, the control system causing the power storage unit to supply power to the mobile terminal when determining that electricity of a battery of the mobile terminal is less than a predetermined amount and the battery is not in a charged state;
the power generation unit including an outer frame fixed on a rear cover or a frame of the mobile terminal;
the toroidal inductance coil located inside the outer frame, and both sides of the toroidal inductance coil connected with opposite sides of the outer frame via elastic members in the direction in which the toroidal inductance coil moves back and forth.

2. The mobile terminal according to claim 1, wherein the toroidal inductance coil includes a toroidal core and a wire wound on the toroidal core, the outer surface of the wire being coated with insulation varnish.

3. The mobile terminal according to claim 2, wherein a cross section of the toroidal core is perpendicular to the magnetic force lines of the permanent magnet.

4. The mobile terminal according to claim 2, wherein a cross section of the toroidal core is a rectangular cross section, a length of which is 20 mm~40 mm and a width of which is 15 mm~30 mm.

5. The mobile terminal according to claim 4, wherein a length of the rectangular cross section is 25 mm and a width of the rectangular cross section is 20 mm.

6. The mobile terminal according to claim 1, wherein the turns of the toroidal inductance coil are 1000 turns~10000 turns.

7. The mobile terminal according to claim 6, wherein the turns of the toroidal inductance coil are 5000 turns.

8. The mobile terminal according to claim 1, wherein either of the sides of the toroidal inductance coil is connected with a corresponding side of the outer frame via two elastic members in the direction in which the toroidal inductance coil moves back and forth.

9. The mobile terminal according to claim 1, wherein the power storage unit includes a bridge rectifier circuit and a power storage circuit, the bridge rectifier circuit being connected with the toroidal inductance coil and the power storage circuit, respectively, the power storage circuit being connected with the power supply circuit of the mobile terminal.

10. The mobile terminal according to claim 1, wherein magnetic induction intensity of the permanent magnet is 0.05 T~0.1 T.

11. The mobile terminal according to claim 10, wherein magnetic induction intensity of the permanent magnet is 0.05 T.

12. The mobile terminal according to claim 1, wherein the control system also is connected with the power generation unit and the loudspeaker, respectively; and the control system causes the power generation unit to stop inputting a current to the power storage unit when determining that the loudspeaker is in a working state.

* * * * *